United States Patent
Bryant et al.

[11] Patent Number: 5,751,910
[45] Date of Patent: May 12, 1998

[54] NEURAL NETWORK SOLDER PASTE INSPECTION SYSTEM

[75] Inventors: Steven M. Bryant, Holley, N.Y.; Kenneth H. Loewenthal, Reston, Va.

[73] Assignee: Eastman Kodak Company, Rochester, N.Y.

[21] Appl. No.: 447,282

[22] Filed: May 22, 1995

[51] Int. Cl.$^6$ .............................. G06K 9/00; G06F 15/18
[52] U.S. Cl. .......................... 395/22; 382/145; 382/147; 382/157; 382/159
[58] Field of Search ........................... 395/22, 23, 3, 395/61, 900; 382/145, 147, 157, 159

[56] References Cited

U.S. PATENT DOCUMENTS

| | | | |
|---|---|---|---|
| 4,688,939 | 8/1987 | Ray | 356/237 |
| 4,731,853 | 3/1988 | Fujisawa et al. | 382/153 |
| 4,995,090 | 2/1991 | Singh et al. | 382/213 |
| 5,046,019 | 9/1991 | Basehore | 395/3 |
| 5,051,932 | 9/1991 | Inoue et al. | 364/550 |
| 5,052,043 | 9/1991 | Gaborski | 382/157 |
| 5,058,178 | 10/1991 | Ray | 382/150 |
| 5,064,291 | 11/1991 | Reiser | 356/372 |
| 5,073,867 | 12/1991 | Murphy et al. | 395/27 |
| 5,148,375 | 9/1992 | Horikami | 364/552 |
| 5,163,111 | 11/1992 | Baji et al. | 395/22 |
| 5,166,985 | 11/1992 | Takagi et al. | 382/192 |
| 5,168,549 | 12/1992 | Takagi et al. | 395/3 |
| 5,175,797 | 12/1992 | Funabashi et al. | 395/22 |
| 5,179,624 | 1/1993 | Amano et al. | 704/232 |
| 5,197,114 | 3/1993 | Skeirik | 395/22 |
| 5,201,026 | 4/1993 | Tsuiki | 395/11 |
| 5,204,718 | 4/1993 | Morita | 355/246 |
| 5,220,373 | 6/1993 | Kanaya | 355/204 |
| 5,239,594 | 8/1993 | Yoda | 382/158 |
| 5,245,671 | 9/1993 | Kobayashi et al. | 382/150 |
| 5,245,695 | 9/1993 | Basehore | 395/3 |
| 5,247,344 | 9/1993 | Doan | 356/394 |
| 5,255,344 | 10/1993 | Takagi et al. | 395/3 |
| 5,255,347 | 10/1993 | Matsuba et al. | 395/23 |
| 5,255,362 | 10/1993 | Brandstetter et al. | 395/25 |
| 5,263,107 | 11/1993 | Ueda et al. | 382/157 |
| 5,268,835 | 12/1993 | Miyagaki et al. | 364/151 |
| 5,272,657 | 12/1993 | Basehore et al. | 364/728.03 |
| 5,305,230 | 4/1994 | Matsumoto et al. | 364/495 |
| 5,359,699 | 10/1994 | Tong et al. | 395/22 |
| 5,455,870 | 10/1995 | Sepai et al. | 382/147 |
| 5,483,603 | 1/1996 | Luke et al. | 382/147 |
| 5,524,176 | 6/1996 | Narita et al. | 395/22 |
| 5,544,256 | 8/1996 | Brecher et al. | 382/149 |

OTHER PUBLICATIONS

"A Function Approximator using Fuzzy Rules Extracted Directly from Numerical Data", by S. Abe and M. Lan, published Oct. 25, 1993. pp. 1887–1892.

"Pattern Recognition Applications for PCB Manufacturing" by S. Hata, published in May 1995, pp. 78–84.

(List continued on next page.)

*Primary Examiner*—Robert W. Downs
*Attorney, Agent, or Firm*—Jeff Rothenberg, Esq

[57] ABSTRACT

A solder paste brick inspection and physical quality scoring system 10 employs a neural network 70 trained with a fuzzified output vector. An image of solder paste bricks 64 on a printed circuit board 12 is acquired by a CCD camera 30. Values of a predetermined set of brick metrics are extracted from the image by a computer 28 and used as a crisp input vector to trained neural network 70. A defuzzifier 76 converts a fuzzy output vector from neural network 70 into a crisp quality score output which can be used for monitoring and process control.

15 Claims, 11 Drawing Sheets

OTHER PUBLICATIONS

S. Hata, "Vision Systems for PCB Manufacturing in Japan," 16th Annual Conf. of IEEE Industrial Electronics Society, vol. 1343, pp. 792–797, Nov. 1990.

S. Hada, et al., "Structure of Neural Networks for Industrial Character Reader," Int'l. Conf. on Industrial Electronics, Control, and Instrumentation, vol. 3, pp. 1888–1892, Nov. 1993.

J.M. Keller and R.R. Yager, "Fuzzy Logic Inference Neural Networks," SPIE vol. 1192 Intelligent Robots and Computer Vision VIII Algorithms and Techniques, pp. 582–591, Nov. 1989.

P.K. Simpson, "Fuzzy Min–Max Classification with Neural Networks," IEEE Conf. on Neural Networks for Ocean Engineering, pp. 291–299, Aug. 1991.

S.K. Pal and S. Mitra, "Multilayer Perceptron, Fuzzy Sets, and Classification," IEEE Trans. on Neural Networks, vol. 3, No. 5, pp. 683–697, Sep. 1992.

H. Ishibuchi, et al., "Neural Networks That Learn from Fuzzy If–Then Rules,"IEEE Trans. on Fuzzy Systems, vol. 1, No. 2, pp. 85–97, May 1993.

C. Neubauer and R. Hanke, "Improving X–Ray Inspection of Printed Circuit Boards by Integration of Neural Network Classifiers," Fifteenth IEEE/CHMT Int'l. Electronics Manufacturing Technology Symp., pp. 14–18, Oct. 1993.

A. Kashitani, et al., "A Solder Joint Inspection System for Surface Mounted Pin Grid Arrays,"Proc. IECON '93—Int'l. Conf. on Industrial Electronics, Control, and Instrumentation, pp. 1865–1870, Nov. 1993.

B.L. Pierce, et al., "Automated Inspection of Through Hole Solder Joints Utilizing X–Ray Imaging," IEEE Aerospace and Electronics Systems Magazine, vol. 9(2), pp. 28–32, Feb. 1994.

H. Asaka, et al., "A Study of Repetitive Training with Fuzzy Clustering," Proc. Third IEEE Conf. on Fuzzy Systems—IEEE World Congress on Computational Intelligence, vol. 3, pp. 1840–1845, Jun. 1994.

Y.H. Chen, "Computer Vision for Industrial Inspection through Linguistic Fuzzy Variable Inputs," 20th Int'l. Conf. on Industrial Electronics, Control and Instrumentation, vol. 2, pp. 1349–1353, Sep. 1994.

C.K. Chak and C. Feng, "Neural Network Implementation of a New Fuzzy System," Proc. 1994 Second Australian and New Zealand Conf. on Intelligent Information Systems, pp. 194–198, Nov. 1994.

C.C. Yao and Y.H. Kuo, "A Fuzzy Neural Network Model with Three–layered Structure," Proc. 1995 IEEE Int'l Conf. on Fuzzy Systems, vol. III, pp. 1503–1510, Mar. 1995.

Y. Cai and H.K. Kwan, "A Fuzzy Inference Network for Classification," 1995 Int'l Conf. on Acoustics, Speech, and Signal Processing, vol. 5, pp. 3499–3502, May 1995.

NEURAL NETWORK SOLDER PASTE INSPECTION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records but otherwise reserves all copyright rights whatsoever.

BACKGROUND OF THE INVENTION

1. Field of the Invention

This invention relates, in general, to neural networks, and, more particularly, to the use of neural networks for the classification of objects, and, still more specifically, to methods and apparatus for training and using neural networks to determine the physical quality of solder paste bricks on printed circuit boards.

2. Background Information

Today, printed circuit boards (PCBs) containing surface mount technology (SMT) components or parts are produced in large quantities and numerous varieties, including computer "mother" boards. The SMT components are mechanically secured and electrically connected to the PCB by soldering their leads to metallic pads on the board.

More particularly, on a bare circuit board, a pattern of metallic pads is provided with a one to one correspondence for each part lead. A solder paste deposit or brick is applied to each board pad via a stenciling process. The SMT part is then placed on the board. The tacky properties of the solder paste holds the part to the substrate. Finally, the board is passed through an oven to reflow the solder paste and create a bond between the part leads and the respective pads.

Newer generation SMT components are getting smaller in size with an increasing number of leads per package. Typically a fine-pitch component such as a quad flat pack device has leads emanating from all four sides of the package with a lead spacing of less then 30 mils. The lead spacing on some parts are 20 mils with 52 leads per side.

As the SMT pads corresponding to the part leads have become smaller and denser, the corresponding apertures in the stencil used to apply the solder paste have also become smaller and denser. With reduced width-to-thickness aspect ratio, the stencil apertures are prone to clogging with dried solder paste, resulting in a poor application of solder paste to the circuit board pad. The resulting solder paste brick can be messy or voided causing various soldering errors. If the SMT pad has a large void of solder paste, an incomplete junction can occur. Solder paste can also slump or spread out, resulting, for example, from humid operating conditions, stencil wear or improper set up procedures, causing shorts between adjacent pads. Such solder related defects associated with the stenciling process can have a significant impact on cost and quality. Ideally, such defects should be detected early in the PCB manufacturing process so that remedial action can be promptly undertaken.

Visual inspection is the current method of choice to reveal defects in the physical quality of solder paste bricks for most manufacturers of SMT assemblies. Unfortunately, this method is inherently inefficient and subject to operator variability. Human visual inspection only provides an approximation of actual quality levels due to the limitations imposed by normal fatigue and eye strain. Other variability is associated with differences between operators.

Automated in-manufacturing line machine vision inspection to identify problems and prevent defects in the physical quality of solder paste bricks on printed circuit boards holds the promise of achieving improved quality levels and reducing rework. However, prior art efforts employing, for example, x-ray inspection to determine the thickness of solder paste after reflow, or laser triangulation to map the topography of the solder paste, have proven to be either slow, very expensive or only partially effective. Further, the earlier systems do not provide a single measure which fully represents the overall quality of the inspected solder paste brick. A need thus exists for an automated on-line solder paste inspection system which is relatively inexpensive to procure and operate, and which provides accurate total quality information in real time.

To address this challenge, the present inventors have investigated the use of neural networks for SMT solder paste quality grading. Neural networks have been successfully studied and applied to a wide variety of different areas. Applications studies have spanned tasks from military pattern recognition to medical diagnosis, and from speech recognition and synthesis to robot and autonomous vehicle control. Neural networks have also been used in imaging applications ranging from OCR applications to face recognition. Typically, a multilayer feedforward neural network is used with a back propagation training paradigm.

Neural networks, often referred to as artificial neural networks, are biologically inspired; that is, researchers are usually thinking about the organization of the brain when considering neural network configurations and algorithms. The artificial neuron, also referred to as a node, was designed to mimic the first-order characteristics of the biological neuron. In essence, a set of inputs are applied, each representing the output of another neuron. Each input is multiplied by a corresponding weight, analogous to a synaptic strength, and all of the weighted inputs are then summed to determine the activation level of the neuron, or node.

As shown in FIG. 3, the simplest node 2 sums N weighted (W) inputs (X) and passes the results through a nonlinearity ($y=f(w,x)$). The nonlinearity, also called the squashing function, is often a hyperbolic tangent. The purpose of this nonlinearity is to limit the output of the node to some finite value, typically $-1$ to $+1$.

Although a single neuron, or node, can perform certain simple pattern detection functions, the power of the neural network comes from connecting nodes into large multilayer networks. The simplest organization of a network consists of one layer of M nodes working in parallel. Multilayer networks can be formed by simply cascading a group of single layers; the output of one layer providing the input to the subsequent layer. FIG. 4 illustrates a conventional multilayer fully connected feedforward network structure along with the feedforward node calculation equation ("Of" being a constant offset value) for each layer.

Neural networks are usually implemented in two distinct steps. The first step is the training step, which is often accomplished off-line in a batch mode. The second and final step is the test step.

Back-propagation training is the most widely used of the neural network paradigms and has been applied successfully in application studies in a broad range of areas. A neural network trained using back-propagation can solve many problems that require pattern mapping; given an input pattern, the network produces an associated output pattern.

Back-propagation is one of the easier networks to understand. It's learning and update procedure is intuitively appealing because it is based on a relatively simple concept: if the network gives the wrong answer, then the weights are corrected so the error is lessened and as a result future responses of the network are more likely to be correct. After many iterative trials with training data, the network converges to a solution and is able to identify the correct output pattern for the given input pattern with a high degree of accuracy. At this point, training is considered complete and the numerical values of the weights in the network are frozen.

Once the neural network is trained, it is used on-line in the test mode, sometimes referred to as the forward pass. In the test mode, no training takes place. Instead, the network is given a new input pattern and the resultant output pattern is calculated and used in some capacity.

The benefits of neural networks extend beyond the high computation rates provided by potentially massive parallelism. Neural networks typically provide a greater degree of robustness or fault tolerance than typical sequential computing machines because there are many more processing nodes, each with primarily local connections. Damage to a few nodes or links thus will not necessarily impair the overall performance significantly.

Neural networks are trained by example, thus there is no need to create a detailed model of the problem before attempting a solution. Accordingly, the neural network approach is attractive in the case of trying to imitate a human operator performing a subjective product inspection along a manufacturing line. In many cases, it is often difficult, if not impossible, to quantify how a human visually inspects and determines if a part, such as a solder paste brick, is good, marginal or poor. Using a neural network does not require quantification or clarification of rules before being used. The network will learn this, by example, from data derived from an expert human operator. Additionally, once trained, the neural network does not suffer from inconsistency that is encountered with a human operator performing the same inspection. Lastly, neural networks provide a significant degree of flexibility to deal with new data. If the network does not perform adequately with new data, it can often be quickly and easily given additional training until desired performance levels are reached.

Neural network technology thus appears to hold great promise for automating inspection and grading of solder paste bricks. However, trials by the inventors have revealed that neural networks trained in the conventional fashion do not converge to a solution, frustrating their application to this problem.

A need thus exists for a new approach for training and using neural networks which will permit application to solder brick inspection and quality grading, as well as other classification problems.

SUMMARY OF THE INVENTION

The present invention satisfies the above described needs, overcomes the shortcomings of the prior art and affords additional benefits by providing a solder paste brick inspection and quality scoring system employing a neural network which is trained with a fuzzified network output vector. The trained neural network, in a test mode, is combined with a defuzzifier which converts a fuzzy output vector of the network into a crisp quality score value.

According to the principles of the present invention, a method for training a neural network to automatically provide a quality score of the physical quality of a test solder paste brick includes the following steps: acquiring an image of each brick of a training set of solder paste bricks; extracting values for a predetermined set of metrics from the acquired image for each brick of the training set; defining a desired quality score for each brick of the training set; fuzzifying the desired quality score for each brick of the training set into a fuzzified quality score vector for each brick in accordance with a predetermined nearness relationship between different quality scores; and applying the extracted values as network inputs and the fuzzified quality score vector as a fuzzy network output vector for each brick of the training set to the neural network in training the neural network to solution convergence. This trained neural network can then be used to determine a quality score of a test solder paste brick by: acquiring an image of the test solder paste brick; extracting values for the predetermined set of metrics for the test solder paste brick from the acquired image of the test solder paste brick; applying the extracted values for the test solder paste brick as inputs to the trained neural network to produce a fuzzy network output vector; and defuzzifying the fuzzy network output vector to provide the quality score for the test solder paste brick.

The present invention also contemplates a method for automatically determining a quality score for a test solder paste brick, involving the steps of: acquiring an image of the test solder paste brick; extracting values for a predetermined set of metrics from the acquired image; applying the extracted values as inputs to a neural network trained using a fuzzified network output vector to produce a fuzzy network output vector for the test solder paste brick; and defuzzifying the fuzzy network output vector to provide a quality score for the test solder paste brick. A high resolution image of the test solder paste brick is preferably acquired using off-axis illumination, dark field reflection and cross polarization. The predetermined set of metrics advantageously includes brick width, brick length, brick area, longitudinal symmetry, mean intensity, brick edge raggedness and brick corner roundness.

The method for automatically determining a quality score, according to the principles of the present invention, is generally applied to multiple test solder paste bricks. Quality scores for the multiple test solder paste bricks can be graphically displayed to provide a quality trend indication. The method is beneficially applied to real time inspection of the physical quality of solder paste bricks for fine-pitch surface mount components in a printed circuit board assembly line; the quality trend indication providing real time feedback for solder paste brick quality control.

The present invention also encompasses apparatus for inspecting fine-pitch surface mount solder paste bricks on printed circuit boards and automatically providing a quality score of the physical quality of the bricks. The apparatus includes a camera for acquiring an image of a solder paste brick being inspected; a computer for extracting values of a predetermined set of brick metrics from the acquired image; and a neural network hosted by the computer and trained with a fuzzy network output vector. The neural network has the extracted values applied as inputs, and outputs a fuzzy quality score for the brick being inspected. A defuzzifier defuzzifies the fuzzy quality score outputted by the trained neural network to provide a crisp quality score for the brick being inspected.

Preferably, an off-axis source of polarized light illuminates the brick being inspected, and a cross polarizer is disposed at an input of the camera. The camera can be controllably positioned relative to a printed circuit board to facilitate camera acquisition of an image of a particular solder paste brick desired to be inspected. Advantageously, the apparatus employs a CCD camera, halogen light source, and an X-Y linear translation stage to reposition the camera.

In a more general aspect, the current invention provides a method of training a neural network having multiple output nodes. Each output node signifies a different output class, and output values of the multiple output nodes collectively define a network output vector. Pursuant to this method, a nearness relationship between the different output classes is determined. The network output vector is fuzzified in accordance with the determined nearness relationship, and the neural network is trained with the fuzzified network output vector to solution convergence. The nearness relationship is preferably characterized by a waveform that monotonically decreases in either direction from a crisp output value. Back propagation training is preferably employed. The resulting trained neural network can then be used to determine an output class of input data. The input data is processed in a feedforward mode with the trained neural network to produce a fuzzy network output vector. This vector is defuzzified to identify the output class for the input data.

The present invention is also directed to a trained neural network designed to produce a fuzzy network output vector whenever input data is processed by the trained neural network. A defuzzifier converts the fuzzy network output vector into a crisp output value. The neural network is trained with a fuzzified network output vector.

In accordance with a further aspect of the present invention, a method of training a neural network includes the steps of: providing a first training data base of crisp input and crisp output pairs; fuzzifying crisp outputs of said first training data base to create a second training data base of crisp input and fuzzified output pairs; and training the neural network with said crisp input and fuzzified output pairs to solution convergence. The crisp outputs are fuzzified in accordance with a predetermined nearness relationship between different crisp outputs. When the neural network is employed for classification of objects, each crisp input used in training is representative of an image of a particular object and each crisp output represents the desired classification of the particular object. When the objects comprise solder paste bricks on at least one printed circuit board, each crisp input represents a machine vision image of a particular solder paste brick, while the crisp output represents an operator generated physical quality score for the particular solder paste brick. Preferably, the crisp input consists of values for a predetermined set of metrics extracted from the machine vision image of a particular solder paste brick. The neural network trained in this manner can be used to determine a quality score of a test solder paste brick by: acquiring a machine vision image of the test solder paste brick; extracting values for the predetermined set of metrics for the test solder paste brick from the acquired machine vision image of the test solder paste brick; applying the extracted values for the test solder paste brick as an input to the trained neural network to produce a fuzzy network output vector; and defuzzifying the fuzzy network output vector to provide a quality score for the test solder paste brick.

The methods and apparatus of the present invention facilitate on-line machine vision inspection, automatic accurate quality scoring, and real time feedback for quality control of solder paste bricks of SMT components, including fine-pitch parts, on printed circuit boards. The many advantages of neural networks are made available to this application, other object classification applications and in other situations where conventional training of a neural network does not result in solution convergence. The present invention thus represents a significant advance in the art.

BRIEF DESCRIPTION OF THE DRAWINGS

Other aspects, features and advantages of the present invention will be apparent from the following detailed description of preferred embodiments when read in conjunction with the accompanying drawings in which.

DETAILED DESCRIPTION

Figure 1:
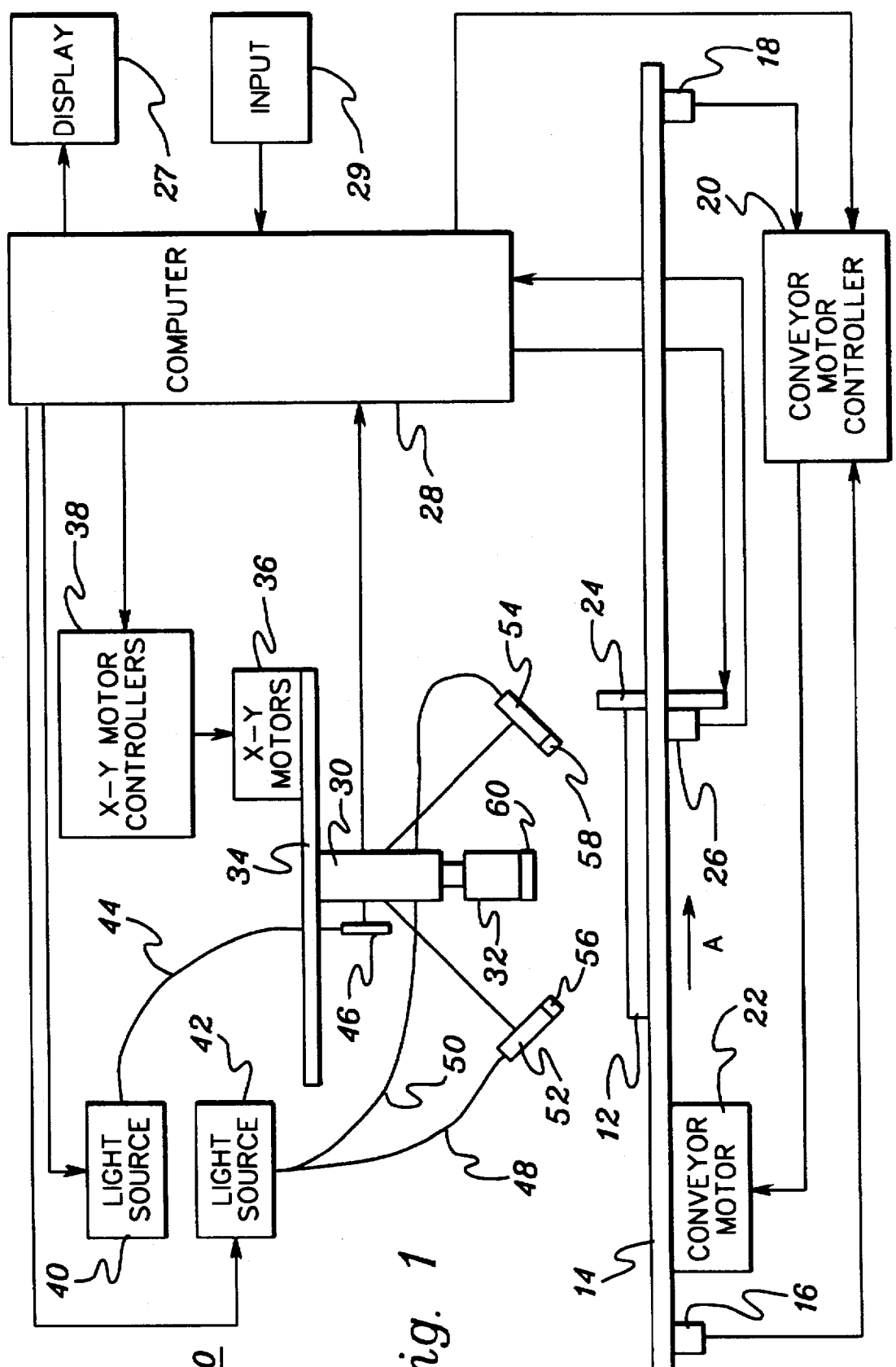
FIG. 1 is a diagrammatic block drawing of a solder brick inspection and quality scoring system, according to the principles of the present invention.

Referring now to the drawings, in which like elements are identified with like reference numbers, a neural network solder paste inspection and quality scoring system 10, constructed according to the principles of the present invention, is illustrated in FIG. 1. System 10 is intended to be used as an on-line inspection tool to inspect and score the physical quality of solder paste bricks on a bare PCB 12, in real time.

A conveyor section 14 transports PCBs 12 in the direction of arrow A. An upstream board sensor 16 and a downstream board sensor 18 provide general board location information to a conveyor motor controller 20. Motor controller 20 controls conveyor motor 22.

Extendible board stops 24 are situated along conveyor 14. PCB 12 on conveyor 14 stops when it comes into contact with the extended board stops 24. A board sensor 26 proximate the board stops 24 detects when a printed circuit board is arrested by the board stops 24 and positioned for inspection. This information is conveyed from board sensor 26 to conveyor motor controller 20 via a computer 28. Controller 20 then deactivates conveyor motor 22.

A camera, for example a digital color CCD camera such as SONY XC-999 is suspended above the stopped PCB 12, with camera lens 32 looking down on the top surface of board 12. Camera 30 is mounted to an X-Y motor driven linear translation stage 34. Translation stage 34 allows camera 30 to be positioned anywhere over PCB 12. Translation stage 34 is actuated by X-Y motors 36 under the control of motor controllers 38. Controllers 38 respond to signals provided by computer 28.

Camera 30 is mounted for movement to a desired viewing position since it has an inadequate field of view and resolution to simultaneously view the whole board 12. Translation stage 34 may comprise a pair of orthogonally oriented linear screw drive positioning stages (not shown) or any other known automatic or manually driven X-Y repositioning apparatus.

Inspection station 10 also includes a pair of light sources 40 and 42, preferably of the halogen type. Light source 40 through a fiber optic cable 44 and lens assembly 46 provides illumination to PCB 12 in a direction generally parallel to the optical axis of camera 30. Light from light source 40 is used to illuminate fiducials on PCB 12, as more fully described hereinafter.

Light from the second light source 42 is transmitted via fiber optic cables 48 and 50, and lens assemblies 52 and 54, respectively, and used to provide off-axis (e.g. at a 45° angle) specular dark field illumination of solder paste bricks on the top surface of PCB 12. Lens assemblies 52 and 54 are each preferably provided with a respective polarizer 56, 58 to polarize the light incident on PCB 12 along a first polarization axis. Camera 30 is outfitted with a cross polarizer 60 having a second axis of polarization offset by 90° from the first polarization axis. Use of off-axis specular dark field illumination in conjunction with crossed polarizers has been found to optimally amplify the image of the solder paste bricks while deamplifying the specular aspects of the underlying flat shiny metallic pads and the flat printed circuit board itself. Of course, other illumination schemes may be employed which allow the camera 30 to capture an image of the solder paste brick with good contrast and resolution for further image processing.

In operation, when sensor 26 signals computer 28 that board 12 is in position for inspection, computer 28 directs motor controllers 38 to position camera 30 above two board fiducials (not shown) in succession. Fiducials are typically round metallic pads generally located at the corners of a PCB to aid in locating the board for various manufacturing operations. Images of the fiducials are acquired by camera 30 and captured into computer 28 through a frame grabber, e.g. a DIPIX frame grabber card part no. P360F, available from Dipix Technologies Inc. of Ottawa, Ontario, Canada. Using a low cost area scan CCD array camera, a 512 by 480 pixel image can be captured. From the pair of fiducial images, computer 28 determines the amount of any slight board rotation and translation on conveyor 14. The board rotation and translation information is used later when images of the solder paste bricks are collected.

Figure 2:
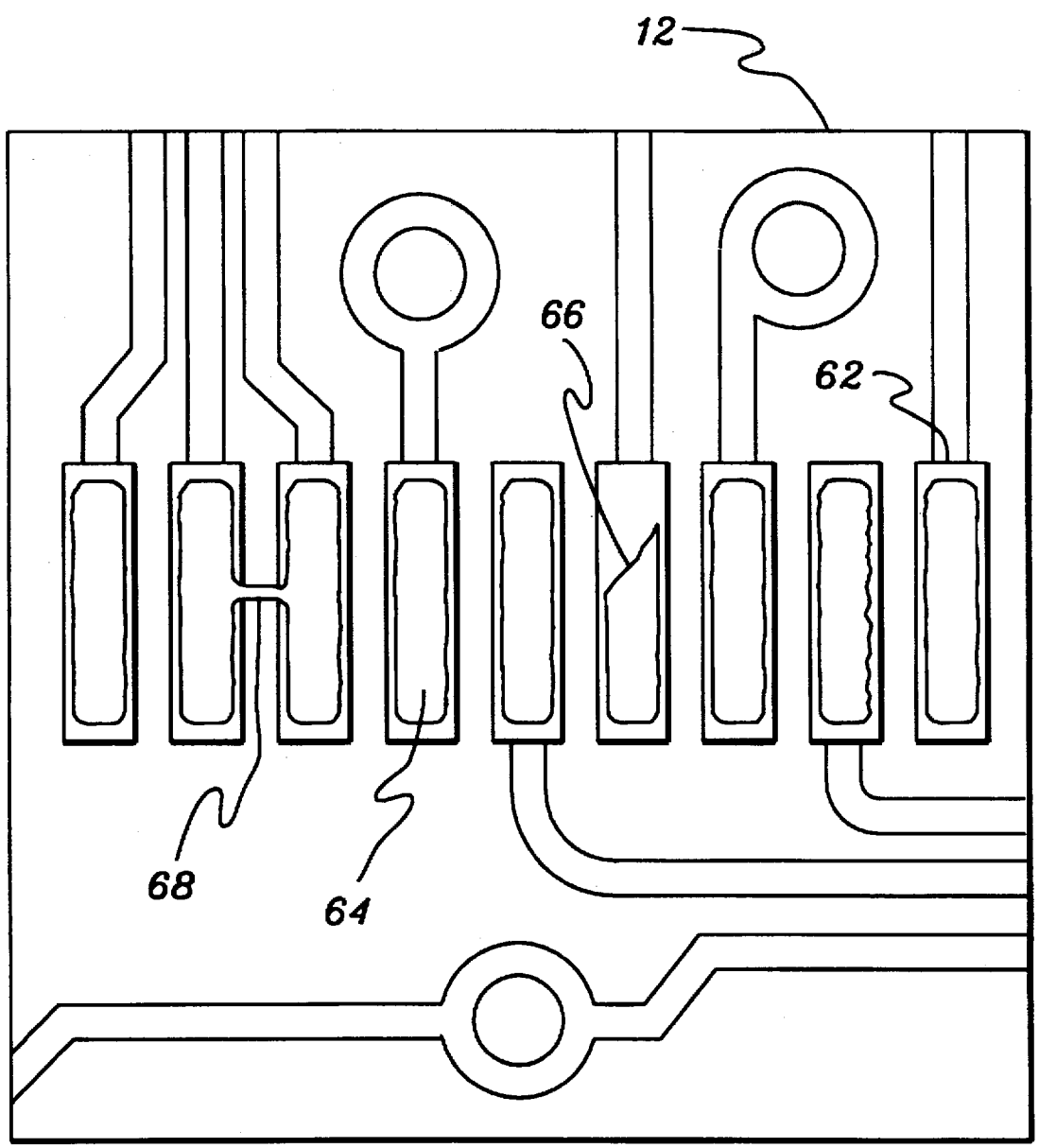
FIG. 2 represents an image of multiple solder paste bricks.
Figure 3:
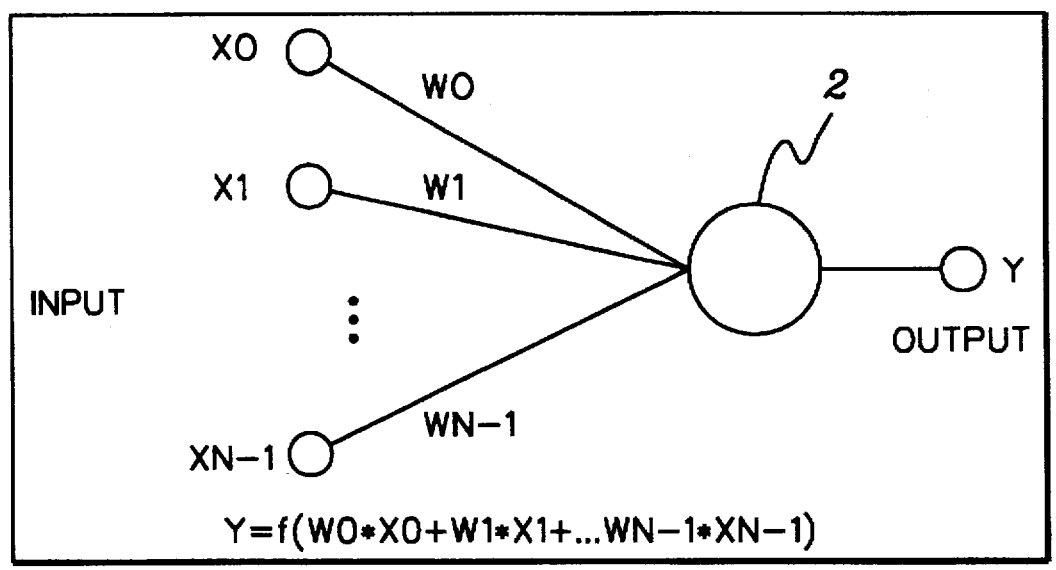
FIG. 3 depicts a single node neural network model.
Figure 4:
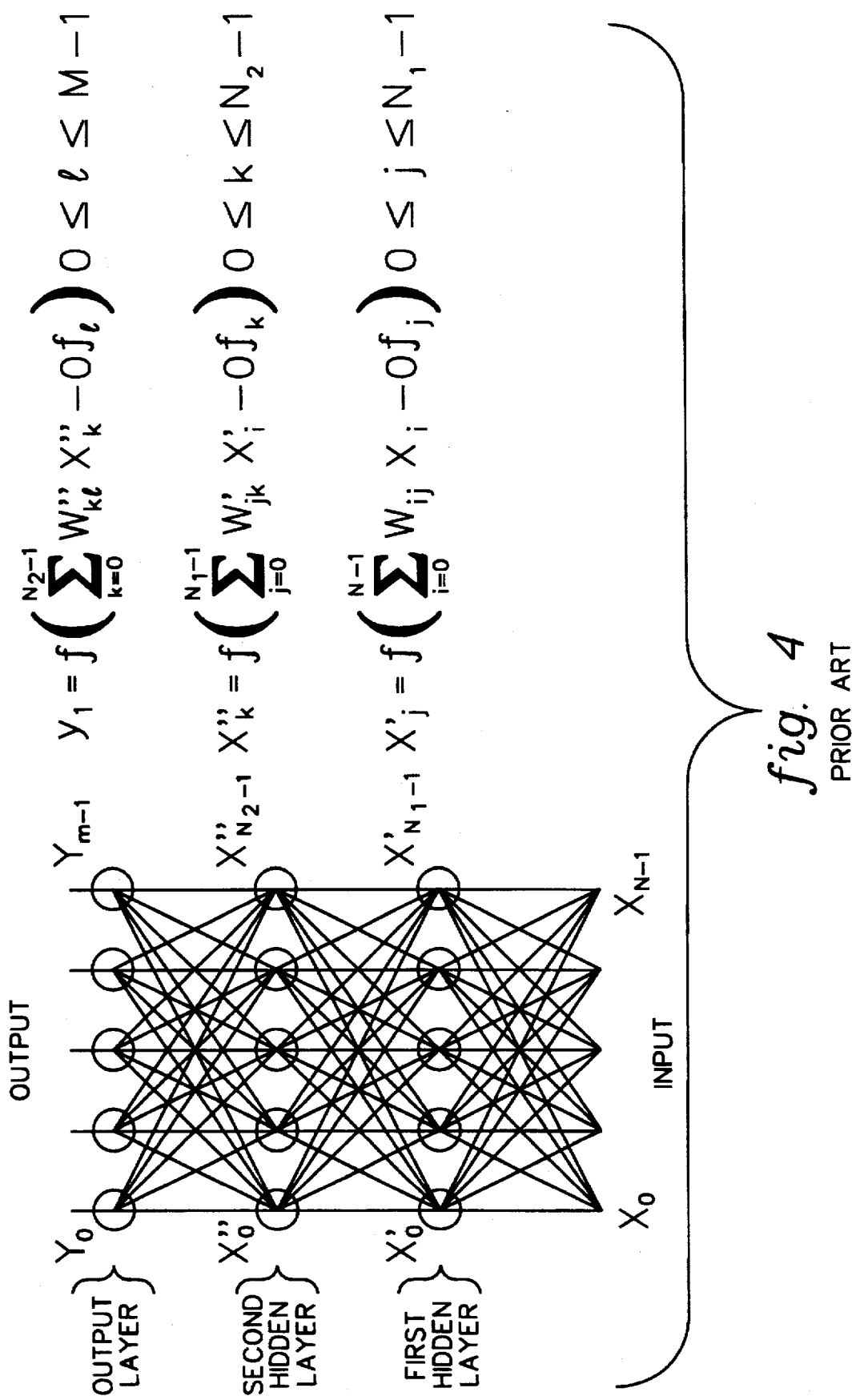
FIG. 4 illustrates a conventional multilayer feedforward neural network.

Camera 30 is then positioned over a desired fine-pitch SMT component fiducial (not shown). Usually each fine-pitch component has its own locating fiducial. The image of this fiducial is captured by camera 30 and processed by computer 28 to make any small corrections in locating individual pads 62 that comprise the location where the part leads will contact the board. When a part fiducial is not present, the system can still locate the pad groups with reasonable accuracy. As shown in FIG. 2, on top of each metallic pad 62, a solder paste brick 64 has been placed during the solder paste stenciling operation. Utilizing the information of the part fiducial location and any board rotation and translation, camera 30 is positioned above a desired group of solder paste bricks so that an image can be taken.

Preferably, all of the fiducial location, part location, part orientation and pad location information is kept in a data base, such as Borland Paradox from Borland of California, for processing by computer 28. Computer 28 may comprise an Intel 80486 compatible computer or any other comparable or higher speed computing equipment. Input devices 29 such as a keyboard and mouse allow for operator interaction with computer 28. Display 27 can be used to visually present output information from computer 28, such as a solder quality trend chart described more fully hereinafter. A live video display (not shown) may also be used to provide an operator with a real time display of the solder brick image captured by camera 30.

A 2-dimensional image of a group of solder paste bricks is taken after the motor controls 38 have positioned the camera 30 in the appropriate spot. The camera resolution can be set, for example, to approximately 2 pixels per mil. At this resolution, a human expert looking at the image, either on the live video display or subsequently, can make a correct determination as to the physical quality of the solder paste brick. Since fine-pitch solder bricks are typically about 12 mils wide and 60 mils long, with an inter-brick spacing on the order of 12–13 mils, this resolution allows for 8 solder paste brick images to be collected from each camera frame. A typical frame capture is shown in FIG. 2. A high contrast image of each solder paste brick 64 resting upon its corresponding pad 62 is obtained. The image of each solder paste brick 64 also includes the surrounding area in its immediate vicinity so that variations, e.g. void 66 and solder bridge 68 are visible. Note that a simple histogram or averaging operation on the area of each solder paste brick is inadequate as a quality measure, since the physical quality grade is highly dependent upon the geometry of the excess paste as opposed to simple quantity. For example, even a thin solder bridge 68 between adjacent bricks is considered a more severe defect than a higher quantity of isolated flakes of solder paste.

At the stated resolution, inspection system 10 is capable of acquiring and processing 1 brick image per second. Frame averaging can be performed, in known manner, on each image captured to reduce scan noise and camera jitter. The collected brick images are then processed by computer 28 to extract values for various image metrics, as more fully described hereinafter. The values of the metrics along with an expert's quality score of the associated image are used as the basis for training a neural network.

Each group of solder paste bricks is imaged and processed by computer 28 until all of the bricks associated with a particular fine-pitch SMT component have been imaged and processed. The system then goes to the next part to be inspected and the same procedure is repeated. This inspection process continues until all desired solder bricks on the board have been inspected. Board stops 24 are then retracted under the control of computer 28, and conveyor motor 22 is reactivated to have conveyor 14 transport board 12 past downstream sensor 18 and into the next assembly stage (not shown). After board 12 has exited the inspection system 10, board stops 24 are raised and the system waits for the next board to arrive.

Computer 28, in addition to its frame grabber function, can also perform conventional image processing and enhancing functions, and then extracts an image of each individual solder paste brick (including its immediate surrounding vicinity) to be inspected. From the image of each individual brick, computer 28 then extracts and determines values of a predetermined set of brick metrics or features. These values are organized for presentation as inputs to a neural network 70, also preferably hosted by computer 28.

Figure 5:
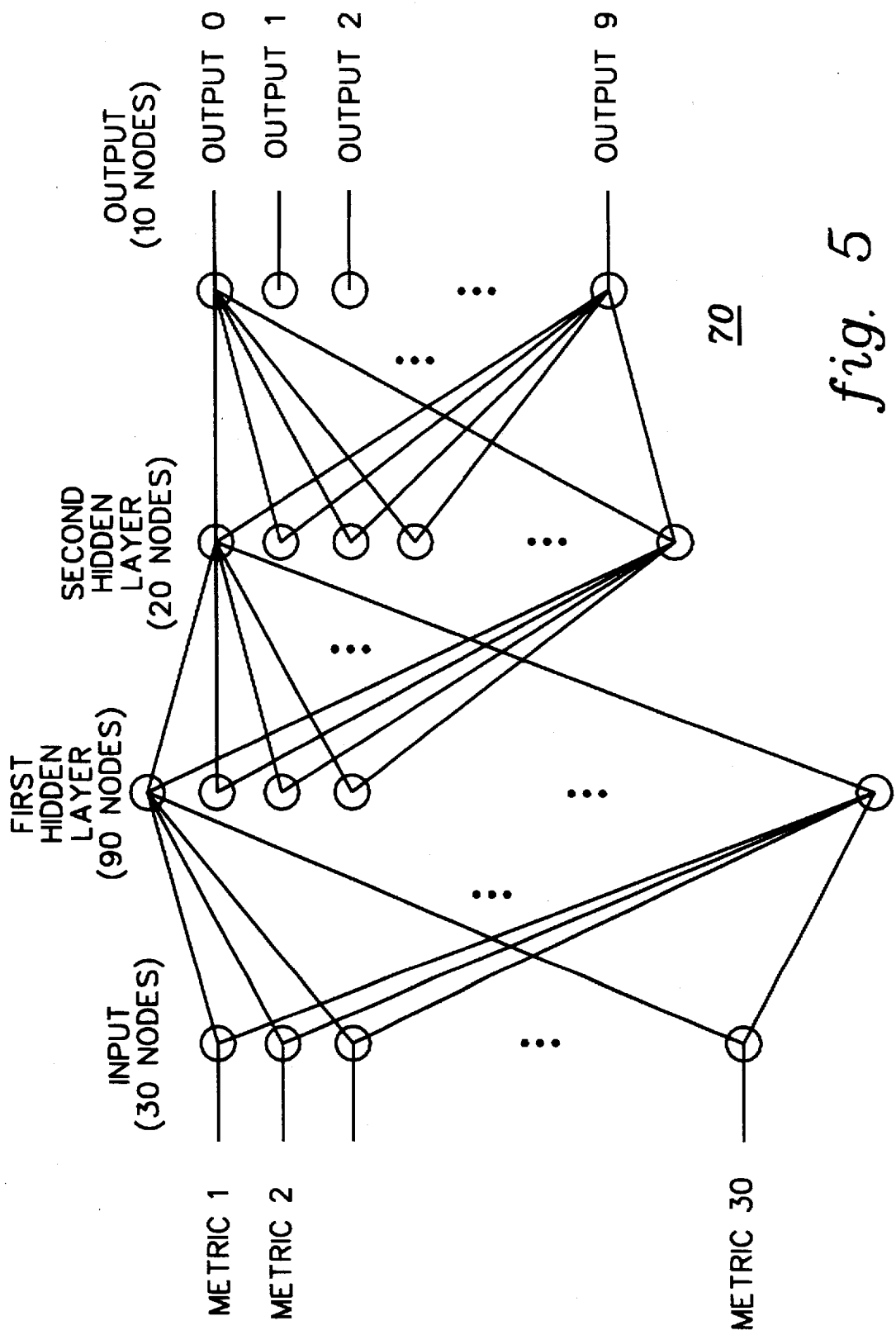
FIG. 5 depicts an exemplary neural network which can be used in the present invention.

A neural network 70 suitable for use in the solder paste inspection system of the present invention is schematically illustrated in FIG. 5. Network 70 is a multilayer, fully connected neural network. The input layer contains 30 nodes corresponding to the 30 different brick metrics used as inputs to the network. In the presently preferred embodiment, a first hidden layer of the network contains 90 nodes, a second hidden layer contains 20 nodes and the output layer contains 10 nodes. Each node in each layer is connected to all of the nodes in the preceding layer. The number of layers and the number of nodes in each layer may vary from that shown.

Each input node corresponds to a solder brick metric of a predetermined set of such metrics. The currently preferred set of metrics comprises:
Metric 1 Binary Threshold
Metric 2 Greyscale Threshold
Metric 3 Width Greyscale
Metric 4 Length Greyscale
Metric 5 Width Binary
Metric 6 Length Binary
Metric 7 Left Edge Binary
Metric 8 Right Edge Binary
Metric 9 Top Edge Binary
Metric 10 Bottom Edge Binary
Metric 11 Left Edge Greyscale
Metric 12 Right Edge Greyscale
Metric 13 Top Edge Greyscale
Metric 14 Bottom Edge Greyscale
Metric 15 Left Edge Deviation
Metric 16 Right Edge Deviation
Metric 17 Top Edge Deviation
Metric 18 Bottom Edge Deviation
Metric 19 Upper Left Corner Roundness
Metric 20 Upper Right Corner Roundness
Metric 21 Lower Left Corner Roundness
Metric 22 Lower Right Corner Roundness
Metric 23 Left Edge Slope
Metric 24 Right Edge Slope
Metric 25 Top Edge Slope
Metric 26 Bottom Edge Slope
Metric 27 Pixel Intensity Histogram Mean
Metric 28 Pixel Intensity Histogram Variance
Metric 29 Solder Brick Area
Metric 30 Solder Brick Symmetry In the above table, the term "Greyscale" refers to an image where each pixel can have 256 different intensity levels, and the term "Binary" refers to an image where each pixel can have 2 intensity levels. In the above list of metrics, when the terms "Greyscale" and "Binary" are referenced they indicate the type of image being used to generate the metric. Other combinations of metrics may be employed as the inputs to the neural network. Collectively, the input values are sometimes referred to as an input vector.

The ten nodes in the output layer each represent a distinct physical quality score or grade ranging from 0 through 9. To train the neural network, each solder paste brick image of a training set is graded as to its overall quality by a human expert. A score of 0 indicates that the brick quality is very high (good), and a score of 9 indicates that the brick quality is very low (poor). Any score of 4 or below indicates that the quality is acceptable. Conversely, any score of 5 and above is judged to be unacceptable. The grading needs to be relatively consistent, so that a meaningful comparison can be made of the neural network's performance.

A data base file of graded training samples is used to train neural network 70. Neural networks require large amounts of data to train on. Accordingly, a large training set of solder brick images is employed. A back-propagation training technique is advantageously used to train the network. Back-propagation is a supervised training paradigm that uses a large set of training data that consists of input data (input vector) and the desired associated output data (output vector).

The desired associated output vector is based upon the expert's quality score. The combination of input vector and output vector is often referred to as a training pair.

Training of the back-propagation network involves the following steps: selecting the next training pair from the training set and applying the input vector to the input nodes of network 70; calculating the neural network output values; calculating the error between the network output and the expert generated desired output; and then adjusting the weight values of the network in a way that minimizes the error. These steps are repeated for each training pair in the training set until the error for the entire set is acceptably low. The network is deemed to have converged to a solution when network processing of all of the training examples results in network outputs that sufficiently match the expert generated desired outputs.

One of the problems with neural networks is that convergence is not guaranteed and in many instances the network never converges to a solution. This is what occurred when attempts were made to grade the quality of solder paste bricks on printed circuit boards using a neural network trained in the conventional manner, i.e. with a crisp output vector. In the solder paste inspection system, the 10 output nodes or classes represent a physical quality range from very good to very poor. Using the standard approach of giving the correct output node a +1 value and the other 9 output nodes a −1 value, the network failed to converge.

Figure 6:
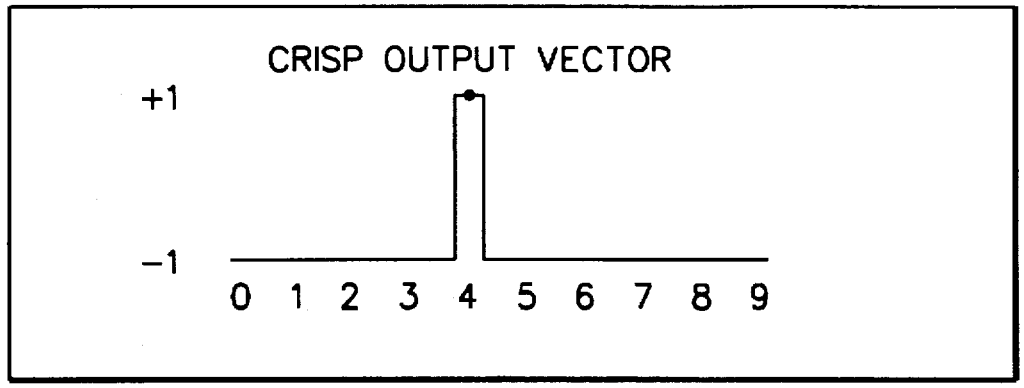
FIG. 6 presents a graphical depiction of a crisp network output vector.

According to the principles of the present invention, this problem is solved by training the network with a fuzzified output vector. The network output vector is fuzzified in accordance with a determined nearness relationship between the different output classes or scores. This nearness relationship recognizes that there is an overlap between adjacent scores, e.g. a quality score of 4 is very similar to a quality score of 5, while a quality score of 1 is very different from a score of 9. By fuzzifying the desired output vector used in network training, a situation is created where outputs close to the correct output are not penalized as severely as outputs farther away from the correct score. This can be accomplished by fuzzifying the output vector with a triangular ramping function that ramps down from +1 to −1 over some distance from the correct output. FIG. 6 depicts a crisp output vector where the correct grade of 4 is given a +1 value at the number 4 output node while all other nodes have a −1 value. This represents the conventional crisp output value training methodology.

Figure 7:
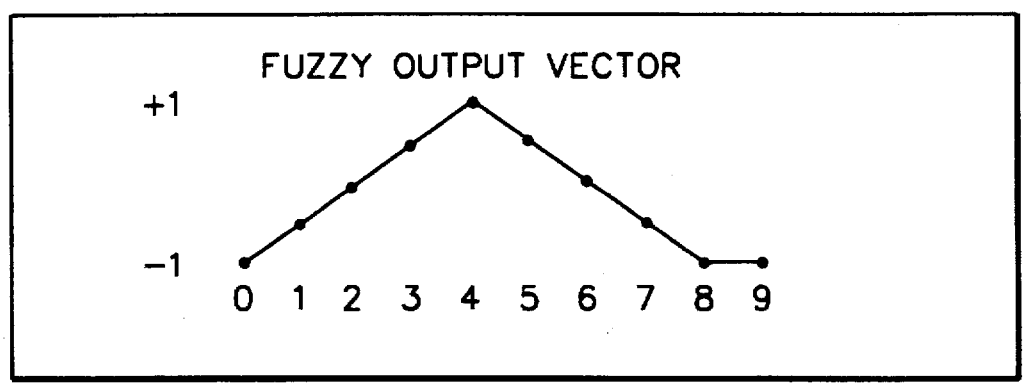
FIG. 7 presents a graphical depiction of a fuzzy network output vector.

FIG. 7 shows a corresponding fuzzified output network vector. In the fuzzified vector, adjacent scores close to the number 4 output node are ramped down until far away from node 4 the nodes reach the −1 value indicating a false condition. Using the above approach to fuzzify the desired output vector employed for training, the neural network 70 converges to solution and provides correct predictions of solder brick quality. The desired output vector can be fuzzified with a different waveform that monotonically decreases on either side of the crisp value, or with any other waveform that accurately reflects the nearness relationship between output classes.

Once the network 70 has converged it can then be tested against new samples that it has not seen before. The true test of the network is not on memorizing past examples, but on generalizing on new samples correctly. If the training set of samples is too small, the network will only memorize those particular examples that it was trained on and will perform poorly on new samples. To get good generalization, many samples are used to train network 70. The key is to have a representative number of samples that covers the input space evenly. The input space is comprised of the multi-dimensional matrix composed of the extracted brick metrics. If all of the points in this input space are clumped in one region for the training set of data, then a new test point far away in some other region of input space will have a low probability of correct scoring. One of the keys of a successful neural network implementation is to have new input examples interpolate between training examples, not to extrapolate to new regions of input space.

Figure 9:
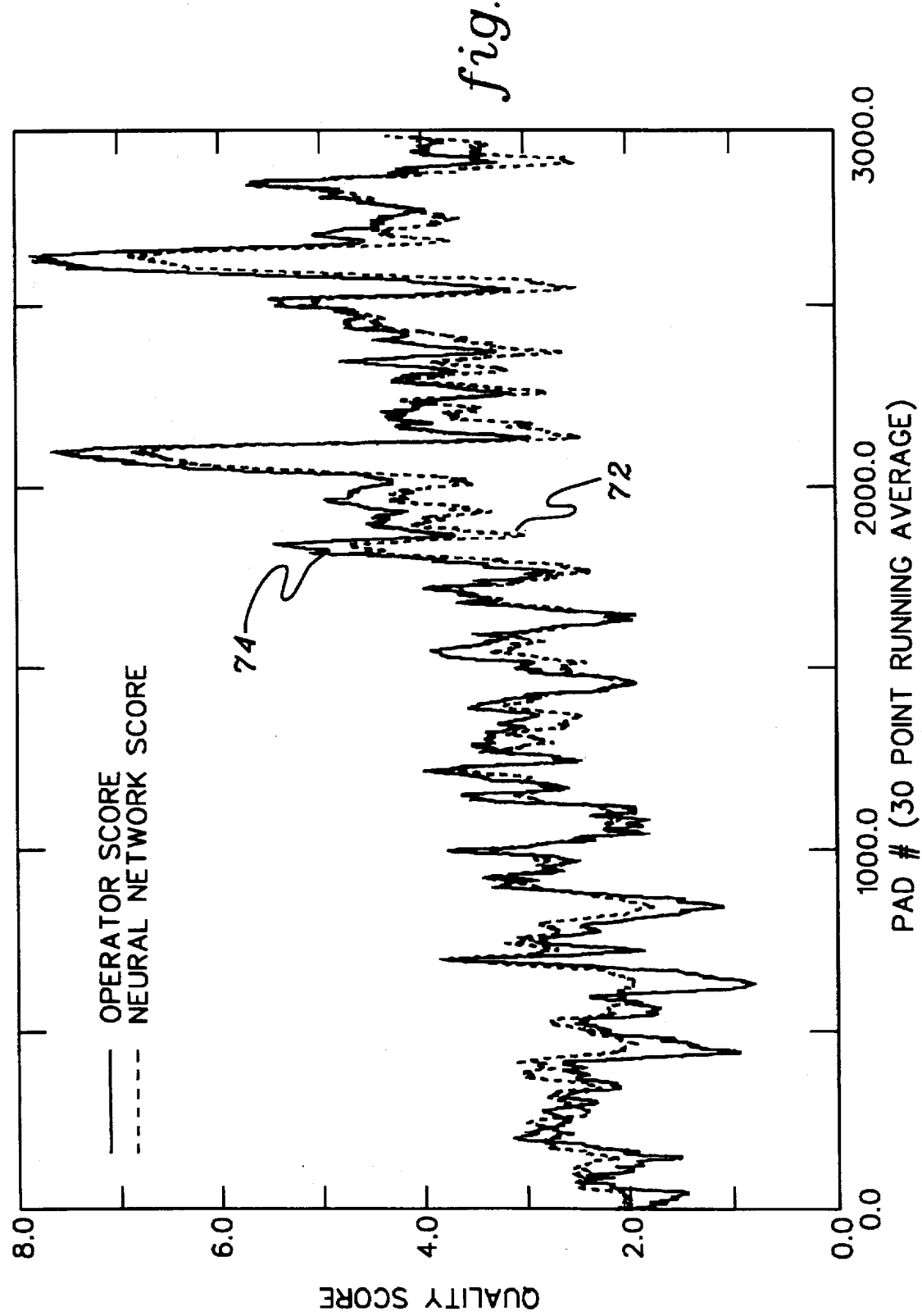
FIG. 9 presents a solder quality trend chart comparing a neural network score with an operator score.

The performance of a neural network trained in accordance with the principles of the present invention, was tested by using a second set of captured data that the network had not seen before. Since the network is intended to be used as a statistical quality control tool to keep the solder printing operation in control, a trend chart was created to compare the network's quality scoring against the quality scores made by the human expert. A 30 point running average is displayed in FIG. 9 showing the network's output scores 72 plotted with the expert's graded scores 74. As can be seen from FIG. 9, there is a very good correlation between the outputs of the network and the expert.

Figure 8:
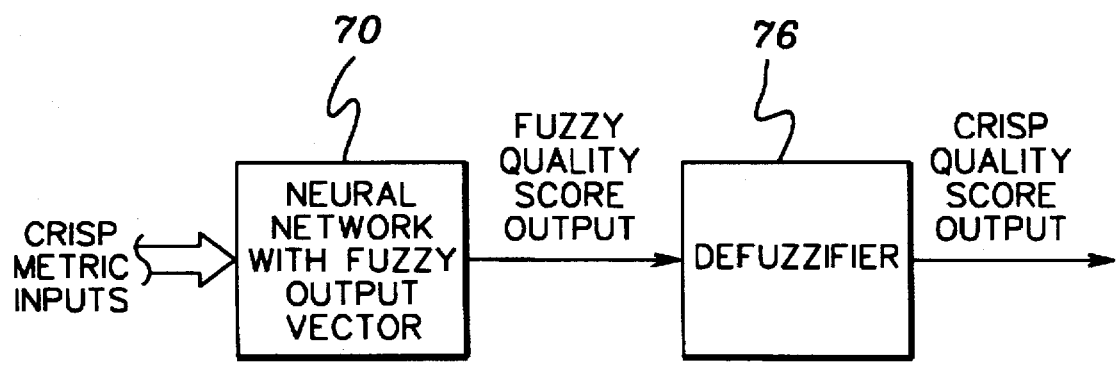
FIG. 8 is a block diagram of apparatus for determining a quality score output according to the principles of the present invention.

Once neural network 70 has been trained to solution convergence and its performance confirmed, the network can be used within inspection system 10 for on-line grading of the physical quality of solder paste bricks. In this on-line inspection mode, the output of neural network 70 is coupled to a defuzzifier 76. The defuzzifier converts the fuzzy quality score output of network 70 into a crisp quality score output. FIG. 8 depicts this operation in block diagram form. As shown, crisp metric inputs are provided to neural network 70 which has been previously trained with a fuzzy output vector. The neural network outputs a fuzzy quality score which defuzzifier 76 then converts into a crisp quality score. Unlike earlier systems which cascaded a full fuzzy logic system to the output of a conventionally trained neural network, the apparatus of FIG. 8 does not require a fuzzifier and rules/evaluation section between the output of the neural network and the defuzzifier. Defuzzifier 76 may operate on a winner take all approach, center of gravity approach or other known defuzzification paradigm. A preferred defuzzifier employs a center of gravity approach and an example routine is included in the appendix.

Figure 10:
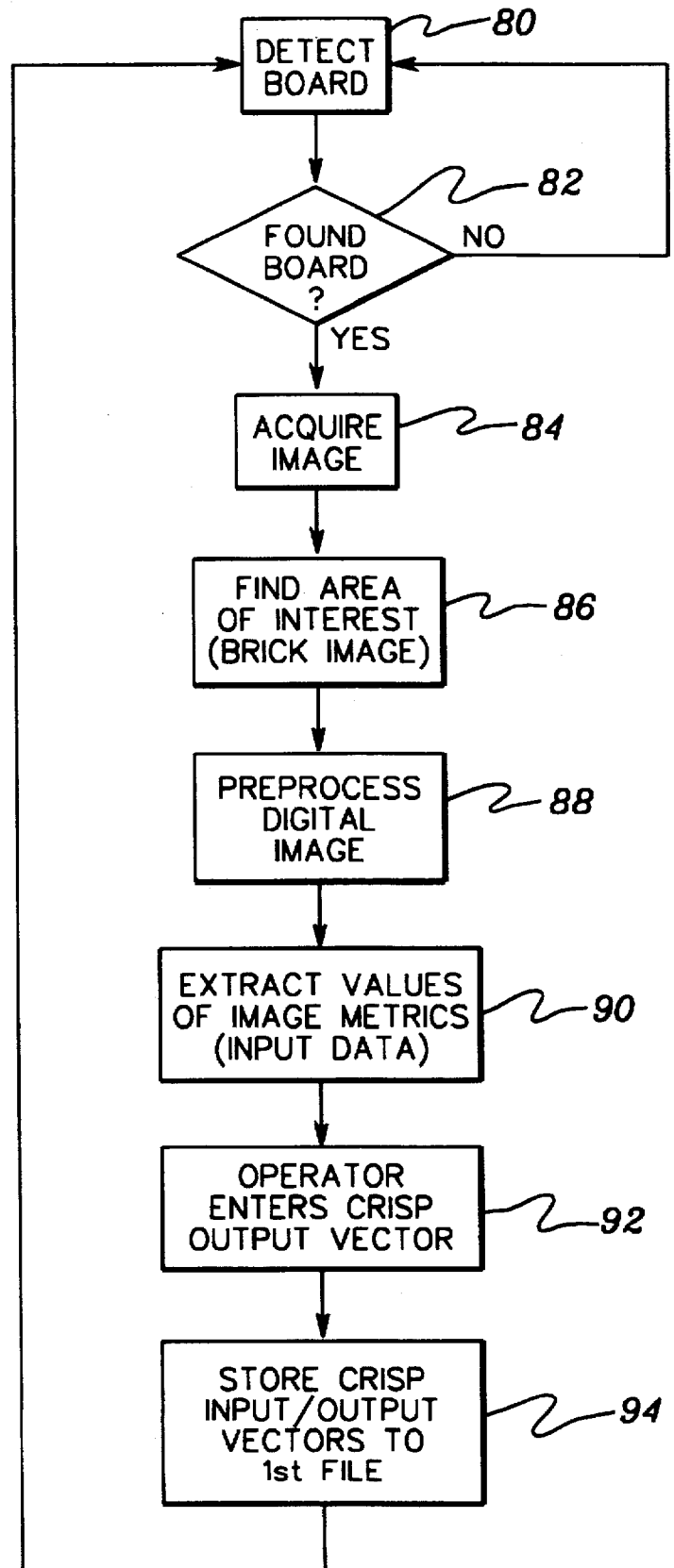
FIG. 10 is a flow diagram of the data collection portion of the network training process.
Figure 11:
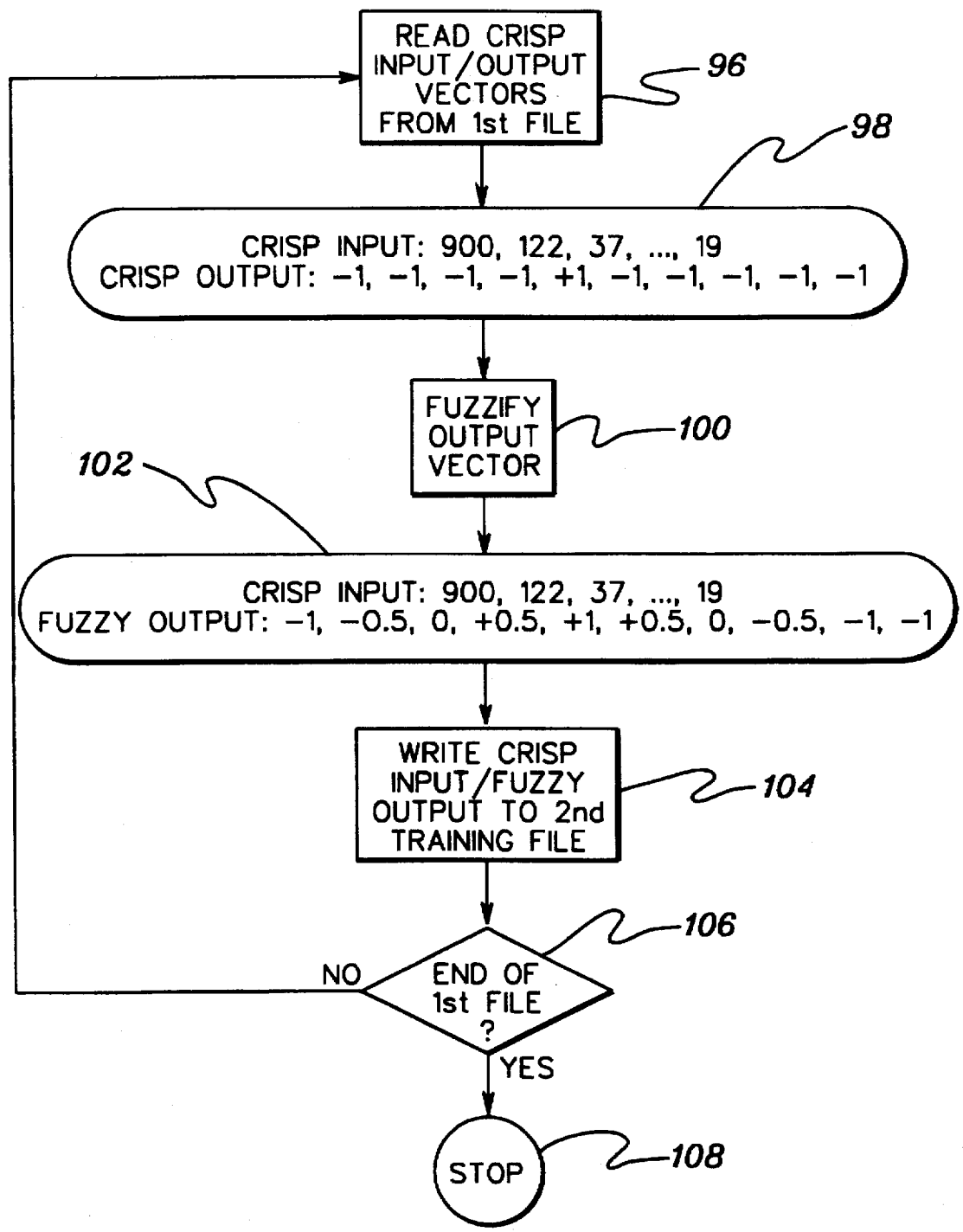
FIG. 11 is a flow diagram of a data conversion portion of the network training process.
Figure 12:
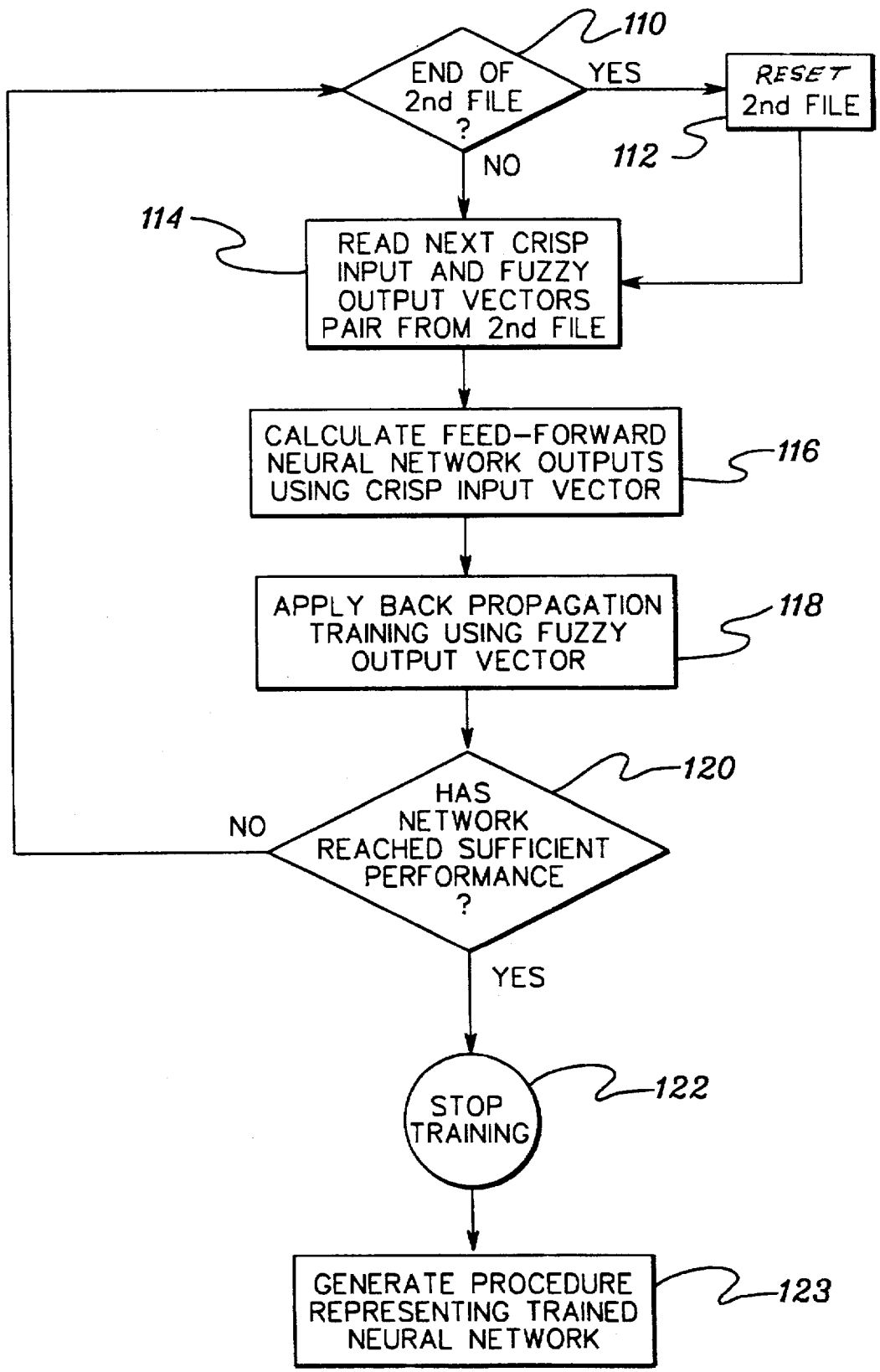
FIG. 12 is a flow diagram of the actual training portion of the network training process.

The flowcharts of FIGS. 10–12 summarize the steps in the neural network training process, in accordance with the principles of the present invention. FIG. 10 presents the data collection portion, FIG. 11 the data conversion portion and FIG. 12 the actual training portion of the training process.

As shown in FIG. 10, the process begins with computer 28 determining whether a printed circuit board is detected at the inspection station by sensor 26 (steps 80, 82). If no board is found, the board detection step repeats. Once a board is found, an image of a desired group of solder paste bricks is acquired with camera 30 (step 84). Computer 28 then locates an area of interest, i.e. an individual solder paste brick image (step 86), and performs any appropriate digital image preprocessing (step 88). Values of a predetermined set of brick metrics are then extracted from the digital image by computer 28 for use as input data to neural network 70 (step 90). Each image is also graded by an operator who enters a desired quality score as a crisp output vector (step 92). The crisp input and output vectors for each training brick image on the printed circuit board are then stored to a first training file or data base (step 94). The process then loops back and repeats for each sample in the training set of solder bricks.

FIG. 11 depicts the training process operations for converting the crisp input and crisp output vector pairs to crisp input and fuzzy output vector pairs. Initially, the crisp input and crisp output vector pairs are read from the first training file (step 96). An example of such a vector pair is shown at 98. The output vector is then fuzzified in accordance with a nearness relationship such as that shown in FIG. 7 (step 100). An example of a resulting crisp input and fuzzy output vector pair is shown at 102. The crisp input and fuzzy output vector pair is then written to a second training file or data base (step 104). A determination is then made as to whether the end of the first training file has been reached (inquiry 106). If not, the next crisp input and crisp output vector pair is read from the first training file and the process repeats. When all of the crisp input and crisp output vector pairs from the first training file have been converted, the procedure shown in FIG. 11 is completed (step 108).

The operations involved in actually training neural network 70 with the vectors in the second training file is illustrated in FIG. 12. This procedure begins with determination as to whether the end of the second file has been reached (inquiry 110). If not, then the next crisp input and fuzzy output vectors pair is read from the second file (step 114). If the end of the second file had been reached, then this file is reset (step 112), before reading of the next crisp input and fuzzy output vectors pair. Next, the feedforward neural network outputs are calculated by the network using the crisp input vector (step 116). The fuzzy output vector is then applied in back propagation training of the network (step 118). If the network has reached sufficient performance (inquiry 120), then the training stops (step 122) and a function or procedure representing the trained neural network is generated (step 123). If not, training continues with the crisp input and fuzzy output vectors pair. The operations depicted in FIG. 12 can be performed with Neuralware Neural Works Professional II/Plus version 3.0, a commercial neural network software package available from NeuralWare Inc. of Pittsburgh, Pa.

Figure 13:
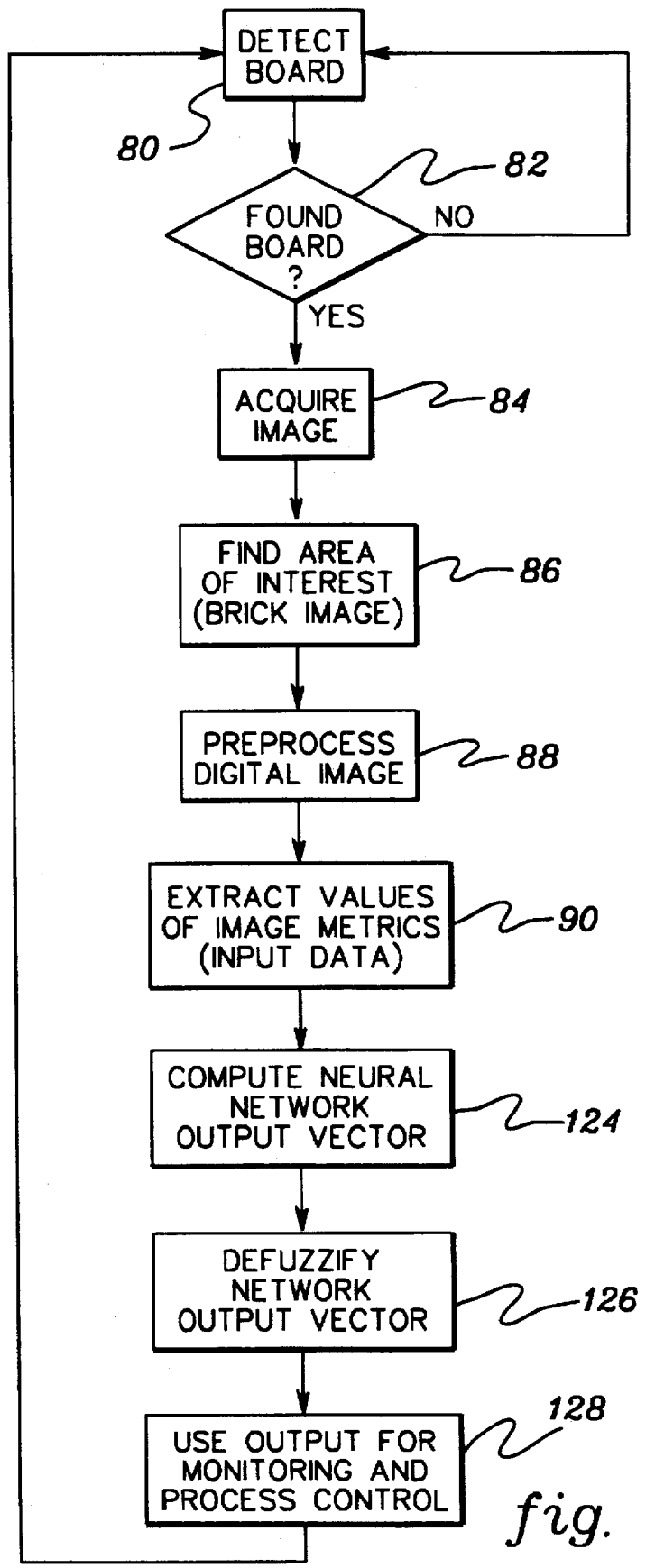
FIG. 13 is a flow diagram of the use of the trained neural network in a test mode.

A flowchart of the procedure for using trained neural network 70 for on-line inspection and quality grading of solder paste bricks is shown in FIG. 13. The initial operations in this testing or inspection mode are identical to those in the data collection procedure of the training mode as shown in FIG. 10 and described above. In the test mode of FIG. 13, the extracted values of brick metrics are applied as inputs to the trained neural network function, and the network computes a fuzzy output vector (step 124). Defuzzifier 76 then defuzzifies the network output vector converting it into a crisp output quality score (step 126). This output score can be used to monitor and control the solder paste stenciling process. Such control might involve the operator cleaning or changing the stencil, adjusting room humidity or temperature, varying the solder paste formulation, etc. The procedure of FIG. 13 is repeated for each solder paste brick to be inspected. A computer program listing for software that has been developed to implement the embodiment of the invention described herein, is appended hereto.

The solder paste inspection and quality scoring system of the present invention provides a relatively inexpensive yet fast and accurate solution to monitoring and controlling solder paste defects as they occur in the manufacturing process. An important step forward in the art has thus been achieved.

The principles of the present invention are applicable to other visual inspection, quality scoring, and/or object classification situations. Whenever there is an interrelationship between output classes of a neural network, fuzzification of the output vector in training can be advantageous in causing the network to converge to a solution.

Although particular embodiments of the present invention have been described and depicted herein, it will be apparent to those skilled in the art that various modifications, substitutions, additions and the like can be made without departing from the scope of the invention, which is defined by the claims appended hereto.

What is claimed is:

1. A training a neural network, comprising the steps of:
   providing a first training data base of crisp input and crisp output pairs;
   fuzzifying crisp outputs of said first training data base to create a second training data base of crisp input and fuzzified output pairs; and training the neural network with said crisp input and fuzzified output pairs to solution conversions, wherein: said crisp outputs are fuzzified in accordance with a predetermined nearness relationship between different crisp outputs, the neural network is employed for classification of objects, the crisp output of each crisp input and crisp output pair is representative of an image of a particular object, and the crisp output of each such crisp input and crisp output pair represents a desired classification of the particular object, and the objects comprise solder paste bricks on at least one printed circuit board, the crisp input of each crisp input and crisp output pair represents a machine vision image of a particular solder paste brick, and the crisp output of each such crisp input and crisp output pair represents an operator generated physical quality score for the particular solder paste brick.

2. The method of claim 1 further comprising the step of extracting values for a predetermined set of metrics from the machine vision image of a particular solder paste brick and using said extracted values as the crisp input.

3. A method of determining a quality score of a test solder paste brick with a neural network trained in accordance with the method of claim 2, comprising the steps of:

acquiring a machine vision image of the test solder paste brick;

extracting values for the predetermined set of metrics for the test solder paste brick from the acquired machine vision image of the test solder paste brick;

applying the extracted values for the test solder paste brick as an input to the trained neural network to produce a fuzzy network output vector; and defuzzifying the fuzzy network output vector to provide a quality score for the test solder paste brick.

4. A method for training a neural network to automatically provide a quality score of the physical quality of a test solder paste brick, comprising the steps of:

acquiring an image of each brick of a training set of solder paste bricks;

extracting values for a predetermined set of metrics from the acquired image for each brick of the training set;

defining a desired quality score for each brick of the training set;

fuzzifying the desired quality score for each brick of the training set into a fuzzified quality score vector for each brick in accordance with a predetermined nearness relationship between different quality scores; and applying the extracted values as network inputs and the fuzzified quality score vector as a fuzzy network output vector for each brick of the training set to the neural network in training the neural network to solution convergence.

5. A method of determining a quality score of a test solder paste brick with a neural network trained in accordance with the method of claim 4, comprising the steps of:

acquiring an image of the test solder paste brick;

extracting values for the predetermined set of metrics for the test solder paste brick from the acquired image of the test solder paste brick;

applying the extracted values for the test solder paste brick as inputs to the trained neural network to produce a fuzzy network output vector; and defuzzifying the fuzzy network output vector to provide a quality score for the test solder paste brick.

6. A method for automatically determining a quality score for a test solder paste brick, comprising the steps of:

acquiring an image of the test solder paste brick;

extracting values for a predetermined set of metrics from the acquired image;

applying the extracted values as inputs to a neural network trained using a fuzzified network output vector to produce a fuzzy network output vector for the test solder paste brick; and defuzzifying the fuzzy network output vector to provide a quality score for the test solder paste brick.

7. The method of claim 6 wherein the image of the test solder paste brick is acquired using off axis illumination, dark field reflection and cross polarization.

8. The method of claim 7 applied to multiple test solder paste bricks, and further comprising the step of graphically displaying quality scores for the multiple test solder paste bricks to provide a quality trend indication.

9. The method of claim 8 applied to real time inspection of the physical quality of solder paste bricks for fine-pitch surface mount components in a printed circuit board assembly line, and further comprising the step of employing the quality trend indication as real time feedback for solder paste brick quality control.

10. The method of claim 6 wherein the predetermined set of metrics includes brick width, brick length, brick area, longitudinal symmetry, mean intensity, brick edge raggedness and brick corner roundness.

11. Apparatus for inspecting fine-pitch surface mount solder paste bricks on printed circuit boards and automatically providing a quality score of the physical quality of the bricks, comprising:

a camera for acquiring an image of a solder paste brick being inspected;

a computer for extracting values of a predetermined set of brick metrics from the acquired image; and a neural network hosted by the computer and trained with a fuzzy network output vector, said neural network having the extracted values applied as inputs to the neural network and outputting a fuzzy quality score for the brick being inspected.

12. The apparatus of claim 11 further comprising a defuzzifier that defuzzifies the fuzzy quality score outputted by the trained neural network to provide a crisp quality score for the brick being inspected.

13. The apparatus of claim 12 further comprising an off-axis source of polarized light for illuminating the brick being inspected, and a cross polarizer at an input of said camera.

14. The apparatus of claim 13 further comprising means for controllably positioning the camera relative to a printed circuit board such that the camera acquires an image of a particular solder paste brick desired to be inspected.

15. The apparatus of claim 14 wherein the camera comprises a CCD camera, the source of light comprises a halogen light source, and the means for controllably positioning comprises an X-Y linear motor translation stage.

* * * * *

UNITED STATES PATENT AND TRADEMARK OFFICE
CERTIFICATE OF CORRECTION

PATENT NO. : 5,751,910
DATED : May 12, 1998
INVENTOR(S) : Steven M. Bryant, et al.

It is certified that error appears in the above-identified patent and that said Letters Patent is hereby corrected as shown below:

Column 12, line 62:
    after "1. A" insert --method of--.

Signed and Sealed this

Twenty-ninth Day of December, 1998

Attest:

BRUCE LEHMAN

*Attesting Officer*       *Commissioner of Patents and Trademarks*